United States Patent
Jiang et al.

(10) Patent No.: US 11,269,672 B2
(45) Date of Patent: Mar. 8, 2022

(54) EVENT GUARD FOR EXCESSIVE VIRTUAL MACHINE REQUESTS

(71) Applicants: ATI TECHNOLOGIES ULC, Markham (CA); ADVANCED MICRO DEVICES (SHANGHAI) CO., LTD., Shanghai (CN)

(72) Inventors: Yinan Jiang, Markham (CA); Kun Xue, Shanghai (CN)

(73) Assignees: ADVANCED MICRO DEVICES (SHANGHAI) CO., LTD., Shanghai (CN); ATI Technologies ULC, Markham (CA)

(*) Notice: Subject to any disclaimer, the term of this patent is extended or adjusted under 35 U.S.C. 154(b) by 112 days.

(21) Appl. No.: 16/399,312

(22) Filed: Apr. 30, 2019

(65) Prior Publication Data
US 2020/0334064 A1    Oct. 22, 2020

(51) Int. Cl.
G06F 9/455    (2018.01)
G06F 13/20    (2006.01)
G06F 13/42    (2006.01)

(52) U.S. Cl.
CPC ......... *G06F 9/45558* (2013.01); *G06F 13/20* (2013.01); *G06F 13/4282* (2013.01); *G06F 2009/45579* (2013.01); *G06F 2009/45591* (2013.01); *G06F 2213/0026* (2013.01)

(58) Field of Classification Search
CPC .. G06F 9/45558; G06F 13/20; G06F 13/4282; G06F 2009/45579; G06F 2009/45591; G06F 2213/0026
See application file for complete search history.

(56) References Cited

U.S. PATENT DOCUMENTS

| | | | |
|---|---|---|---|
| 2014/0298339 A1* | 10/2014 | Jani | G06F 21/50 718/1 |
| 2017/0134403 A1* | 5/2017 | Hearn | H04L 63/1425 |
| 2019/0050295 A1* | 2/2019 | Ding | G06F 11/1441 |
| 2019/0230114 A1* | 7/2019 | Grebovich | H04L 63/1416 |

* cited by examiner

*Primary Examiner* — Emerson C Puente
*Assistant Examiner* — Jonathan R Labud

(57) ABSTRACT

A processing system detects excessive requests sent on behalf of a virtual machine executing at the processing system within a predetermined period of time and denies subsequent requests sent on behalf of that virtual machine until after the predetermined period of time has elapsed in order to grant access to resources of the processing system for servicing requests from other virtual machines and to prevent a virtual machine that has been compromised by an attack from overwhelming the processing system with malicious requests. The processing system sets a threshold number of event requests for each type of event request that can occur within a predetermined period of time. If the number of event requests of a certain type exceeds the threshold for that event type, the processing system ignores subsequent event requests of that type until the predetermined period of time has expired.

21 Claims, 4 Drawing Sheets

EVENT GUARD FOR EXCESSIVE VIRTUAL MACHINE REQUESTS

BACKGROUND

Virtualization of computing resources allows the sharing of physical resources of a host system between different virtual machines (VMs), which are software abstractions of physical computing resources. The host system allocates a certain amount of its physical resources to each of the VMs so that each VM is able to use the allocated resources to execute applications, including operating systems (referred to as "guest operating systems"). Virtualization technology enables system administrators to shift physical resources into a virtual domain. For example, the physical host system can include physical devices (such as a graphics card, a memory storage device, or a network interface device) that, when virtualized, include a corresponding virtual function (VF) for each VM executing on the host system. As such, the VF's provide a conduit for sending and receiving data between the host machine and the virtual machines. However, VFs are vulnerable to malicious attacks in virtual machines that can overwhelm the host system.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
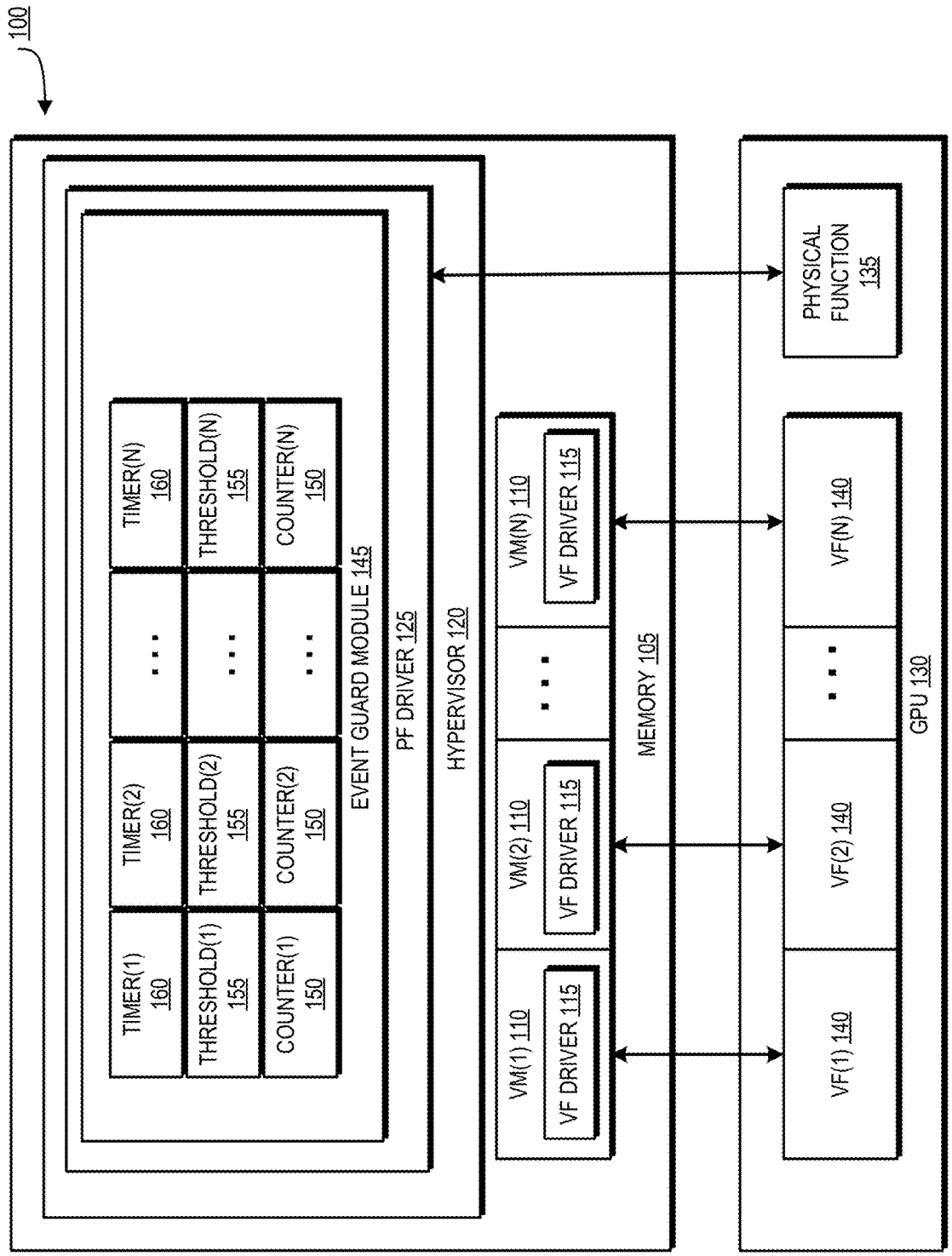
FIG. 1 is a block diagram of a system for hosting virtual machines and virtual functions including event guard modules to protect against malicious attacks by compromised virtual functions in accordance with some embodiments.

FIGS. 1-4 illustrate example systems and techniques for detecting excessive requests from a virtual function (VF) within a predetermined period of time and denying subsequent requests from that VF until after the predetermined period of time has elapsed in order to grant access to devices, such as GPUs, for servicing requests from other VFs and to prevent a VF that has been compromised by an attack from overwhelming the devices with malicious requests. A processing system allocates resources, such as one or more central processing units (CPUs) or graphics processing units (GPUs), among VFs for each virtual machine (VM) executing at the processing system by scheduling cycles of CPU or GPU time to the VMs. For example, in some embodiments, a hypervisor for the processing system allocates blocks of cycles of GPU time (also referred to as "time slices") to the VMs in a round-robin fashion. To request an out of order service or request permission to exceed a scheduled time slice, a VF issues an event request (also referred to as an event) to the hypervisor. Some event requests require a relatively long time, on the order of hundreds of milliseconds, to finish, such that an excessive number of event requests by a VF will potentially occupy a disproportionate amount of GPU time to service and deprive other VFs of their designated time slices.

To protect the processing system from servicing excessive requests from a VF at the expense of servicing other VFs during regularly-scheduled time slices, the processing system employs one or more counters to track event requests sent from each VF during a predetermined time period. Different types of event requests take varying amounts of time to service and can be expected to occur with varying frequencies. For example, a first type of event request is a function level reset, which is expected to occur no more than a certain number of times within a given time frame. A second type of event request is an exclusive access mode request (also referred to as an exclusive access request), which in some embodiments is expected to occur more frequently than a function level reset within the same given time frame. The processing system therefore sets a threshold number of event requests for each type of event request that can occur within a predetermined period of time. If the number of event requests of a certain type from a VF within the predetermined time period exceeds the threshold for that event type, the processing system ignores subsequent event requests of that type from that VF until the predetermined period of time has expired. For example, if the processing system sets a threshold of three function level resets per VF within a predetermined time period of 60 seconds, the processing system will ignore any additional function level reset requests from a VF until 60 seconds after receipt of the first function level reset request. After the 60 seconds have elapsed, the processing system starts the predetermined time period anew and resumes servicing additional function level resets.

FIG. 1 is a block diagram of a processing system 100 for hosting virtual machines and virtual functions in accordance with some embodiments. The processing system 100 comprises multiple virtual machines (VMs) 110 that are configured in memory 105 on the processing system. Resources from physical devices of the processing system 100 are shared with the VMs 110. The resources can include, for example, a graphics processor resource from GPU 130, a central processing unit resource from a CPU (not shown), a memory resource from memory, a network interface resource from network interface controller, or the like. The VMs 110 use the resources for performing operations on various data (e.g., video data, image data, textual data, audio data, display data, peripheral device data, etc.). In one embodiment, the processing system 100 includes a plurality of resources, which are allocated and shared amongst the VMs 110.

The processing system 100 also includes a hypervisor 120 that is represented by executable software instructions stored in memory 105 and manages instances of VMs 110. The hypervisor 120 is also known as a virtualization manager or virtual machine manager (VMM). The hypervisor 120 controls interactions between the VMs 110 and the various physical hardware devices, such as the GPU 130. The hypervisor 120 includes software components for managing hardware resources and software components for virtualizing or emulating physical devices to provide virtual devices, such as virtual disks, virtual processors, virtual network interfaces, or a virtual GPU as further described herein for each virtual machine 110. In one embodiment, each virtual machine 110 is an abstraction of a physical computer system and may include an operating system (OS), such as Microsoft Windows® and applications, which are referred to as the guest OS and guest applications, respectively, wherein the term "guest" indicates it is a software entity that resides within the VMs.

The VMs 110 generally are instanced, meaning that a separate instance is created for each of the VMs 110. Although two virtual machines (e.g., VM(1) and VM(2)) are shown, one of ordinary skill in the art will recognize that a host system may support any number N of virtual machines. As illustrated, the hypervisor 120 provides two virtual machines VM(1) and VM(2), with each of the guest virtual machines 110 providing a virtual environment wherein guest system software resides and operates. The guest system software comprises application software and VF device drivers 115, typically under the control of a guest OS.

In various virtualization environments, single-root input/output virtualization (SR-IOV) specifications allow for a single Peripheral Component Interconnect Express (PCIe) device (e.g., GPU 130) to appear as multiple separate PCIe devices. A physical PCIe device (such as GPU 130) having SR-IOV capabilities may be configured to appear as multiple functions. The term "function" as used herein refers to a device with access controlled by a PCIe bus. SR-IOV operates using the concepts of physical functions (PF) and virtual functions (VFs), where physical functions are full-featured functions associated with the PCIe device. A virtual function (VF) is a function on a PCIe device that supports SR-IOV. The VF is associated with the PF and represents a virtualized instance of the PCIe device. Each VF has its own PCI configuration space. Further, each VF also shares one or more physical resources on the PCIe device with the PF and other VFs.

In the example embodiment of FIG. 1, SR-IOV specifications enable the sharing of graphics processing unit 130 among the virtual machines 110. The GPU 130 is a PCIe device having a physical function 135. The virtual functions 140 are derived from the physical function 135 of the graphics processing unit 130, thereby mapping a single physical device (e.g., the graphics processing unit 130) to a plurality of virtual functions 140 that are shared with the guest virtual machines 110. In some embodiments, the hypervisor 120 maps (e.g., assigns) the virtual functions 140 to the guest virtual machines 110. In another embodiment, the hypervisor 120 delegates the assignment of virtual functions 140 to a physical function (PF) driver 125 (also referred to as a host physical driver) of the GPU 130. For example, VF(A) 140 is mapped to VM(A) 110, VF(B) 140 is mapped to VM(B) 110, and so forth. The virtual functions 140 appear to the OS of their respective virtual machines 110 in the same manner as a physical GPU would appear to an operating system, and thus, the virtual machines 110 use the virtual functions 140 as though they were a hardware device. In the illustrated example, the PF driver 125 is depicted as implemented at the hypervisor 120. In some embodiments, the PF driver 125 implemented at the host kernel (not shown).

Driver support for the virtual functions 140 is provided using VF drivers 115 (also referred to as guest virtual drivers) installed in the guest OS of the virtual machines 110. As used herein, a device driver is a computer program-based component that configures a machine and acts as a translator between a physical device and the applications or operating systems that use the device. A device driver typically accepts generic high-level commands and breaks them into a series of low-level, device-specific commands as required by the device being driven. The VF drivers 115 perform the same role as a typical device driver except that they run on the virtual functions 140. Each VF driver 115 comprises a set of instructions for directly interacting with a corresponding VF 140 of the GPU 130.

In contrast, physical function 135 is contacted via PF driver 125, which is implemented in the hypervisor 120 or in the host kernel. The PF driver 125 manages functions for the GPU 130 and is responsible for configuring shared resources. The PF driver 125 may or may not contain all traditional driver functionalities to provide access to the resources of the GPU 130. Further, the PF driver 125 may also be called to perform operations that impact the entire GPU 130 device. Any device specific operations that globally affect all VMs 110 are only accepted from the PF driver 125. To ensure this exclusivity, the drivers in the VMs 110 (e.g., VF drivers 115) need to communicate control operations to the PF driver 125. Generally, the VFs 140 only have the ability to send and receive data, and the ability to perform resets on themselves. Each individual VF 140 is able to only reset itself, and not the entire GPU 130. In another embodiment, the VFs 140 are not permitted to reset themselves. Instead, the PF 135 or PF driver 125 performs the VF reset on behalf of the VFs 140.

Outside of the above-mentioned capabilities, the VF drivers 115 communicate with the PF driver 125 to perform its operations. For example, in some embodiments, VF drivers 115 (also referred to as guest drivers 115) handshake with the PF driver 125 (also referred to as host driver 125) through a GPU hardware mailbox (not shown) for events that require the host system to service a VF outside of the VF's regularly-scheduled time slice (i.e., out of order), or to exceed the regularly-scheduled time slice, such as virtual function initialization, information exchange (also referred to as general interrupt requests), and function level reset requests. A function level reset request is a request to reset a function such as video output, audio output, or image capture for a VF 140 without resetting other functions associated with the VF 140.

Initialization of a VF involves configuring hardware registers of the GPU 130. The hardware registers (not shown) store hardware configuration data for the GPU 130. A full set of hardware registers is accessible to the physical function 135. In contrast, VFs 140 each implement only a subset of PCIe configuration space registers. In one embodiment, some of the hardware registers are instanced for each of the VFs 140 while some other hardware registers are shared by all of the VFs 140. Some of the hardware registers are shared among multiple VFs by using context save and restore to switch between and run each function. Therefore, exclusive access to the hardware registers is required for the initializing of new VFs. As used herein, "exclusive access" refers to the GPU registers being accessible by only one virtual function at a time during initialization of VFs 140. When a virtual function is being initialized, all other virtual functions are paused or otherwise put in a suspended state where the virtual functions and their associated virtual machines do not consume GPU 130 resources. When paused or suspended, the current state and context of the VF/VM are saved to a memory file. In some embodiments, exclusive access to the hardware registers allows a new virtual function to begin initialization by pausing other running functions. After creation, the VF is able to be directly assigned an I/O domain. The hypervisor 120 assigns a VF 140 to a VM 110 by mapping configuration space registers of the VFs 140 to the configuration space presented to the VM by the hypervisor. This capability enables the VF 140 to share the GPU 130 and to perform I/O operations without CPU and hypervisor software overhead.

In some embodiments, a request is sent from a new VF to the PF driver 125 for requesting the initialization of the new VF. The physical function 135 and the new VF establish a two-way communication channel that uses an acquire-release protocol to start and end the VF's exclusive accesses to hardware registers in the GPU. The physical function 135 uses a timing control to monitor the exclusive register access by the new VF and ensure that the exclusive access is completed within a predetermined time period. The incoming new VF is only granted a predetermined time period of exclusive access to complete its initialization process. If the exclusive access period is timed out, the controlling physical function 135 has an option to terminate the VF so as to prevent prolonged GPU stalls. However, in some embodiments, the physical function 135 allows a VF to exceed the predetermined time period to complete its initialization process (referred to as an exclusive access timeout) up to a threshold number of times in a given time period. If the VF uses more than the threshold number of exclusive access timeouts in the given time period, the physical function 135 will ignore any additional mailbox messages from the VF until after the time period has elapsed.

In some embodiments, after a new virtual function finishes initializing, a GPU scheduler (not shown) triggers world switches between all already active VFs (e.g., previously initialized VFs) which have already finished initialization such that each VF is allocated GPU time to handle any accumulated commands. Allowing the previously initialized VFs to process accumulated commands and perform already scheduled computing tasks helps to prevent the VFs from being labeled as inactive or hung, thereby avoiding unnecessary resets of the VFs.

To facilitate the performance of already scheduled computing tasks and to prevent the host system from servicing excessive events sent by VFs compromised by malicious attacks, the processing system 100 includes an event guard module 145 for each VF 140. The event guard modules 145 can be implemented as hard-coded logic of the processing system 100, as firmware or programmable logic of the processing system 100, or a combination thereof or in the PF driver 125. Each event guard module 145 includes one or more counters (not shown) and one or more corresponding timers (not shown) to track a number of events of a given type sent from a VF driver 115 on behalf of a VF 140 to the PF driver 125 within a predetermined time period. The event guard module 145 for each VF 140 compares the number of events of a given event type initiated by the VF 140 that are tracked by the counter to a corresponding threshold (not shown) for the given event type. If the number of events of a given event type for a given VF 140 tracked by the counter exceeds the threshold for that event type for that VF 140, the event guard module 145 signals the PF driver 125 to ignore additional requests of the event type from the VF 140 until after the predetermined time period has expired. In the interim, the PF driver 125 continues servicing events or performs already scheduled computing tasks from other VFs.

In some embodiments, the event guard module 145 employs a counter and a timer for each of a plurality of event types for each of the VFs 140. For example, in some embodiments, the event guard module 145 for a VF 140 employs a first counter for tracking function level reset requests, a second counter for tracking exclusive access requests (e.g., initialization or re-initialization requests), a third counter for tracking exclusive access timeout events, and a fourth counter for tracking general interrupts. The threshold defines a number of events of each event type that the PF driver 125 is permitted to service for a given VF 140 in a predetermined time period. In some embodiments, the event guard module 145 for a VF 140 sets the duration of the predetermined time period and the threshold number of events based on the event type. In some embodiments, the processing system 100 includes a plurality of GPUs 130, and the event guard module 145 selectively sets the duration of the predetermined time period and the threshold number of events for each event type to be the same for some or all of the GPUs 130 or independently for a subset or all of the GPUs 130 of the processing system 100.

To illustrate, in operation, the PF driver 125 performs world switches among a plurality of VFs 140 in which each VF is allocated time slices for resources of the GPU 130. In response to a VF 140 sending a request (e.g., via the VF driver 115 handshaking with the PF driver 125 through the GPU 130 mailbox (not shown) for one of a plurality of event types (e.g., function level reset, exclusive access, exclusive access timeout, or general interrupt), the event guard module 145 determines if a timer has already been started for the requested event type for the VF 140 sending the request. If a timer has for the requested event type for the VF 140 sending the request has not already been started, the event guard module 145 starts the timer and sets the timer to a predetermined time period for the event type. If a timer has already been started, the event guard module 145 compares a value of a counter corresponding to the event type for the VF 140 to the threshold for the event type. If the value of the counter does not exceed the threshold for a current predetermined time period, the PF driver 125 services the event request and increments the counter. If the value of the counter exceeds the threshold, the PF driver 125 ignores the event request and continues servicing regularly-scheduled computing tasks from other VFs until after the current predetermined time period has elapsed.

For example, in one embodiment, the event guard module 145 implements the thresholds and predetermined time periods shown in Table 1 for each of the listed event types:

TABLE 1

| Event | Threshold | Predetermined time period |
| --- | --- | --- |
| Function level reset | 3 | 60 seconds |
| Exclusive access | 9 | 60 seconds |
| Exclusive access timeout | 2 | 500 seconds |
| General interrupt | 56 | 60 seconds |

In the embodiment implementing the thresholds and predetermined time periods of Table 1, if a given VF 140 requests a function level reset 3 times within 60 seconds, the event guard module 145 removes the VF 140 from the GPU scheduler (not shown) and signals the PF driver 125 to ignore any additional event requests from the VF 140 until after 60 seconds from the time of the first function level reset requested by the VF 140. Similarly, if a given VF 140 requests exclusive access 9 times within 60 seconds, the event guard module 145 signals the PF driver 125 to ignore additional requests to enter exclusive mode from the VF 140 until after 60 seconds from the VF 140's first exclusive access request. If a VF 140 encounters an exclusive access timeout (i.e., permission to exceed the time allotted for an exclusive access) twice within 500 seconds, the event guard module 145 signals the PF driver 125 to ignore any additional event requests from the VF 140 until after 500 seconds from the VF 140's first exclusive access timeout. Lastly, if a VF 140 issues 56 general interrupts within 60 seconds, the event guard module 145 signals the PF driver 125 to ignore any additional event requests from the VF 140 until after 60 seconds from the VF 140's first general interrupt. When a VF 140 sends an event request of a particular event type after the predetermined time period for the event type for that VF 140 has elapsed, the event guard module 145 resets the timer 160 for that event type and VF 140.

Figure 2:
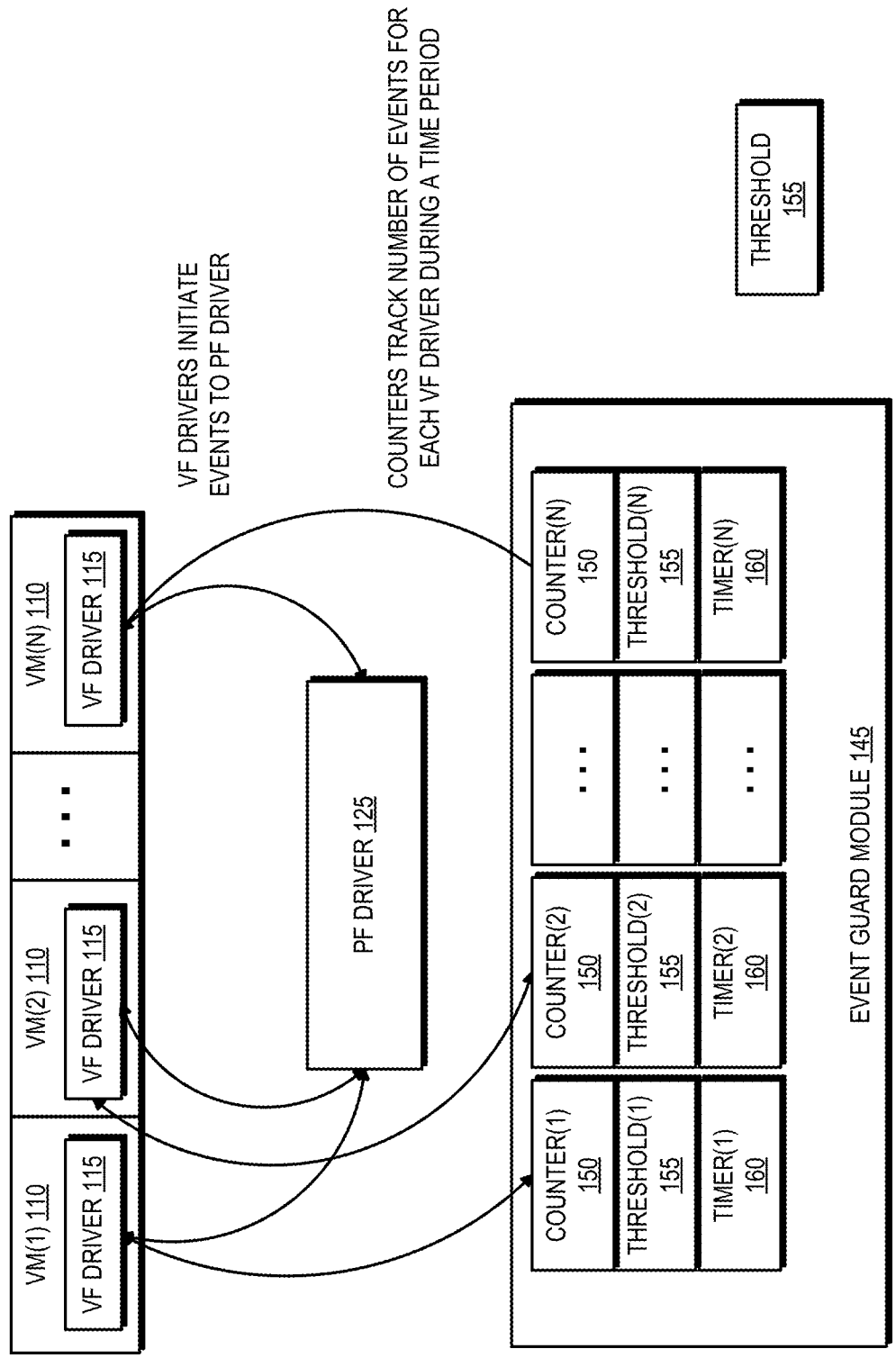
FIG. 2 is a block diagram illustrating an embodiment of a plurality of event guard modules in accordance with some embodiments.

FIG. 2 illustrates an embodiment of two event guard modules 145 of FIG. 1 tracking events initiated by virtual function (VF) drivers 115 in accordance with some embodiments. The event guard modules—event guard module(A) 145 and event guard module(B) 145—each include a counter 250, a threshold 255, and a timer 260 for each of N event types corresponding to each of the VF drivers 115 and virtual machines (VMs) 110 executing at the graphics processing unit (GPU) 130. Each of the counters 250 tracks events of an event type sent from the corresponding VF driver 115 to the physical function (PF) driver 125.

Each of the timers 260 is programmed or otherwise set to a predetermined time period for the event type being tracked by the corresponding counter 250. For example, in some embodiments, the timer(A(1)) 260 is set to a time period of 60 seconds for an event type of functional level reset, while the timer(A(2)) 160 is set to a time period of 500 seconds for an event type of exclusive access timeout. In some embodiments, each timer 160 measures a predetermined time period starting with the initiation of each event of each event type from the corresponding VF driver 115. Once the predetermined time period for an event type expires, the timer 260 is configured to be reset by the event guard module 145 in response to the corresponding VF driver 115 sending a subsequent event of the event type being tracked by the counter 250 to the PF driver 125 on behalf of the VM 110.

Each event guard module 145 further includes a threshold 255 for the event type being tracked by the corresponding counter 250. For example, in some embodiments, the threshold(B(1)) 255 is set to 3 for an event type of functional level reset, and the threshold(B(2)) 255 is set to 9 for an event type of exclusive access request.

As each virtual function driver 115 initiates events of various event types on behalf of the corresponding virtual machines 110 to the physical function driver 125, the counters 250 of the corresponding event guard module 145 track events of each of N event types for the corresponding VF driver 115 during time periods tracked by the corresponding timers 260. The event guard modules 145 compare the numbers of events of each event type tracked by the counters 250 to the thresholds 255 for the corresponding event types. If the number of events of an event type tracked by a counter 250 exceeds the threshold for that event type during the predetermined time period set at the timer 260, the event guard module 145 suppresses servicing of subsequent events of that event type sent by the corresponding VF driver 115 until after the predetermined time period for that event type and VM 110 has expired. Until the predetermined time period expires, the PF driver 125 continues servicing other requests from the other VF drivers 115 and performing regularly-scheduled tasks on behalf of the other VMs 110.

Figure 3:
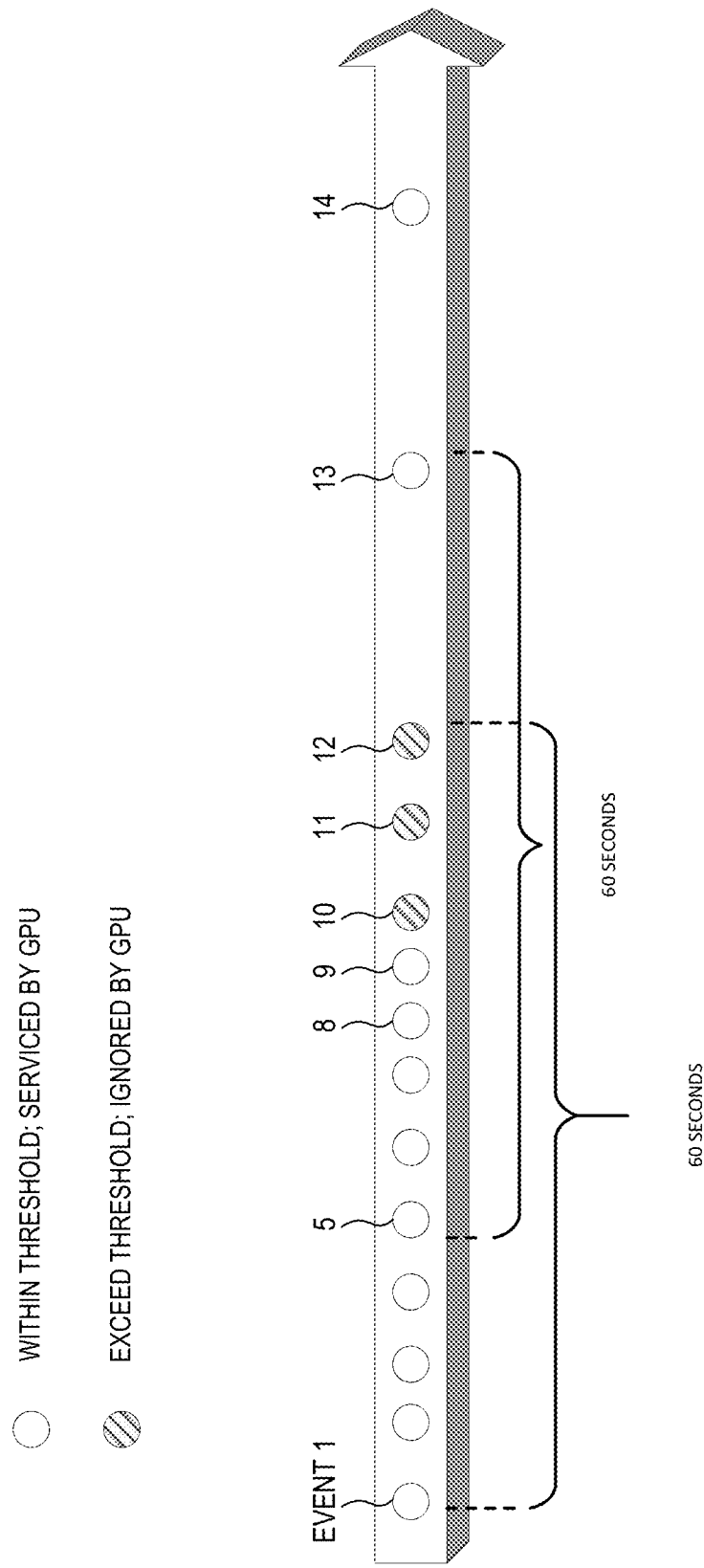
FIG. 3 is a timeline illustrating out of threshold events that are ignored by the processing system in accordance with some embodiments.

FIG. 3 is a timeline illustrating out of threshold events that are ignored by the processing system 100 of FIG. 1 in accordance with some embodiments. In the illustrated example, the event type is exclusive access requests, for which the predetermined time period is 60 seconds and the threshold number of events is 9. The event guard module 145 tracks the number of exclusive access requests sent by the virtual function driver 115 during each 60-second time period and compares the number to the threshold. Within the first 60-second time period, the virtual function driver 115 sends 12 exclusive access requests on behalf of the corresponding virtual function 140 to the physical function driver 125. Because the first 9 exclusive access requests are within the threshold, the event guard module 145 allows the physical function driver 125 to service the exclusive access requests for the VF 140. However, the $10^{th}$, $11^{th}$, and $12^{th}$ exclusive access requests exceed the threshold of 9, so the event guard module 145 signals the PF driver 125 to ignore events 10, 11, and 12.

In the 60 seconds preceding the initiation of the $13^{th}$ exclusive access request, the event guard module 145 counts 9 exclusive access request events. Therefore, the $13^{th}$ event is within the threshold of 9, and the event guard module 145 allows the physical function driver 125 to service the $13^{th}$ exclusive access request. Likewise, the event guard module 145 determines that the $14^{th}$ exclusive access request is within the threshold and the event guard module allows the $14^{th}$ event to be serviced.

Figure 4:
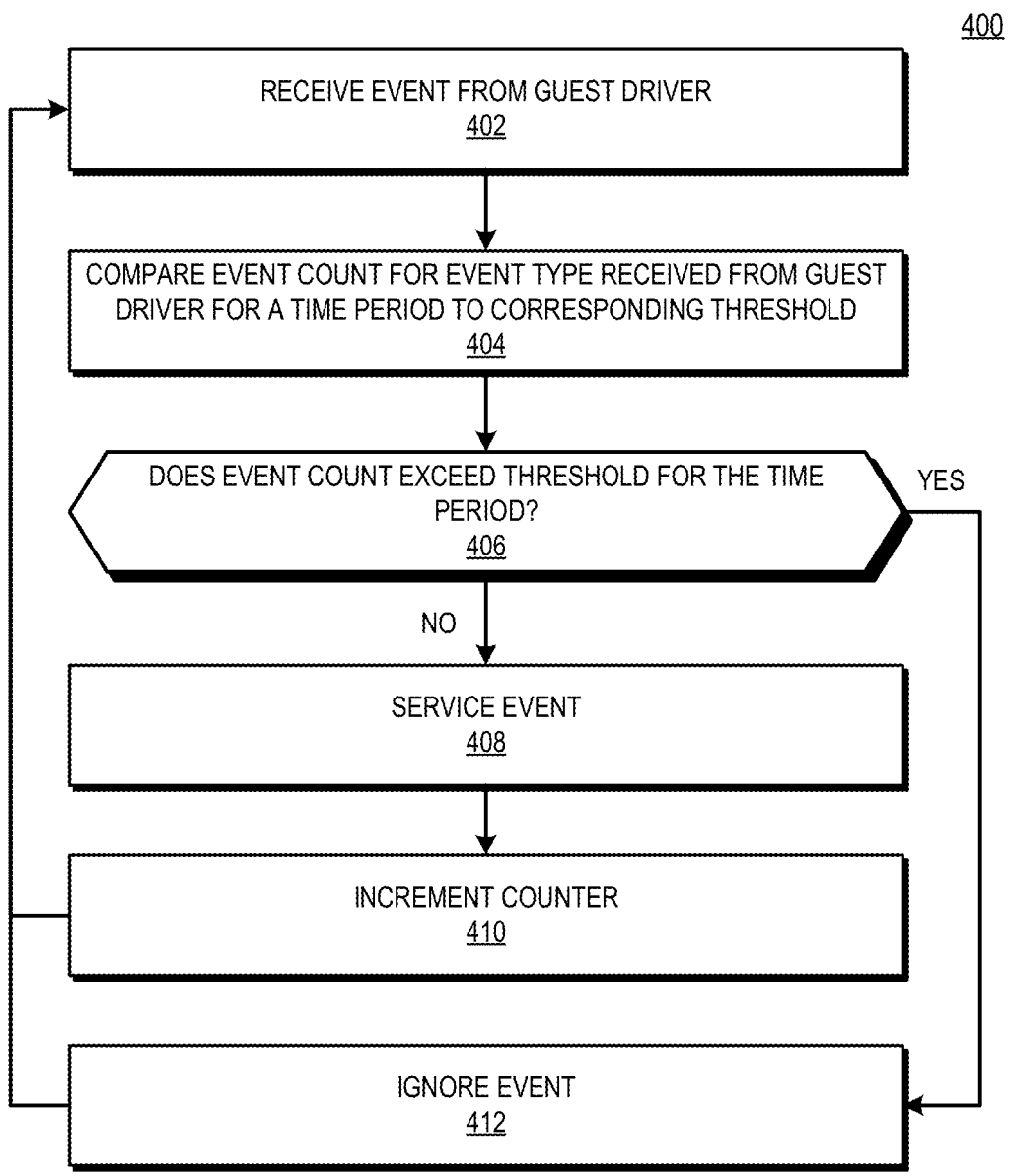
FIG. 4 is a flow diagram illustrating an example method for protecting the processing system from malicious attacks by compromised VFs in accordance with some embodiments.

FIG. 4 is a flow diagram illustrating a method 400 for protecting the processing system of FIG. 1 from servicing excessive events sent on behalf of a virtual machine in accordance with some embodiments. At block 402, the host physical function driver 125 receives an event request of an event type from a guest virtual function driver 115 on behalf of a virtual function 140 executing at the GPU 130. At block 404, the event guard module 145 compares an event count (i.e., number of events) of the event type from the guest VF driver 115 during a predetermined time period to a threshold for the event type. At block 406, the event guard module 145 determines whether the event count exceeds the threshold for the event type for the VF driver 115. If, at block 406, the event guard module 145 determines that the event count does not exceed the threshold for the event type for the VF driver 115, the event guard module 145 allows the host physical function driver 125 to service the event at block 408. At block 410, the event guard module 145 increments the counter 150, after which the method flow continues back to block 402.

If, at block 406, the event guard module 145 determines that the event count exceeds the threshold for the event type for the VF driver 115, the method flow continues to block 412. At block 412, the event guard module 145 signals the physical function driver 125 to ignore the event. The method flow then continues back to block 402.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   tracking, at a host system, a number of events sent from a guest virtual function;
   in response to determining that the number of events sent from the guest virtual function within a first predetermined period of time exceeds a first threshold, ignoring subsequent events from the guest virtual function during a remaining portion of the first predetermined period of time; and
   after the first predetermined period of time has elapsed, servicing subsequent events sent from the guest virtual function and resetting a timer for events received from the guest virtual function.

2. The method of claim 1, wherein:
   the number of events comprises events of a first type of event.

3. The method of claim 2, wherein the first type of event comprises one of: function level reset requests, exclusive access mode requests, exclusive access time out events, or generic interrupt requests for a virtual function at a resource of the host system.

4. The method of claim 2, wherein the first threshold and a duration of the first predetermined period of time are based on the first type of event.

5. The method of claim 2, further comprising:
   tracking a number of events of a second type of event different from the first type of event sent from the guest virtual function; and
   in response to determining that the number of events of the second type of event sent from the guest virtual function within a second predetermined period of time exceeds a second threshold, ignoring subsequent events of the second type of event received from the guest virtual function during a remaining portion of the second predetermined period of time.

6. The method of claim 2, further comprising setting the first threshold and a duration of the first predetermined period of time for a plurality of resources at the host system.

7. The method of claim 1, wherein:
   tracking the number of events sent from the guest virtual function comprises tracking the number of events for each of a plurality of event types for each of a plurality of virtual functions executing at a resource of the host system; and
   further comprising:
   for each event type for each of a plurality of virtual functions, setting a threshold number of events and a duration of the first predetermined period of time.

8. The method of claim 7, further comprising:
   after the first predetermined period of time has elapsed for an event type for a virtual function,
   resetting a counter for the event type for the virtual function to zero, wherein tracking is performed using one or more counters.

9. The method of claim 7, further comprising:
   in response to detecting fewer than the threshold number of events of a first event type sent from the guest virtual function during the first predetermined period of time, servicing subsequent events of the first event type sent from the guest virtual function during the first predetermined period of time.

10. The method of claim 7, wherein the plurality of event types comprises at least one of: function level reset requests, exclusive access mode requests, exclusive access time out events, or generic interrupt requests for at least one of the plurality of virtual functions executing at the resource.

11. The method of claim 7, wherein the threshold number of events and a duration of the first predetermined period of time are based on each type of event.

12. The method of claim 7, further comprising setting the threshold number of events and the duration of the first predetermined period of time for each of a plurality of resources at the host system.

13. The method of claim 7, further comprising:
   in response to detecting more than the threshold number of events of a second event type sent from the guest virtual function during a second period of time, ignoring subsequent events of the second event type sent from the guest virtual function to the host system until the second period of time has elapsed.

14. A method comprising:
   tracking, at a host system, a number of events of a first type of event sent from a guest virtual function driver for a first virtual function to a host physical driver for a resource of the host system;

receiving, at the host physical driver, a first present event of the first type of event; and in response to determining that the number of events of the first type of event sent from the guest virtual function driver within a first predetermined period of time exceeds a first threshold, ignoring the first present event; and in response to determining that the number of events of the first type of event sent from the guest virtual function driver within the first predetermined period of time does not exceed the first threshold, servicing the first present event, wherein the tracking is performed using a first counter and the response to determining that the number of events of the first type of event sent from the guest virtual function driver within the first predetermined period of time does not exceed the first threshold further comprises incrementing the first counter.

15. A processing system to host a plurality of guest virtual machines (VMs), comprising:
a first processor with resources allocated to the plurality of guest VMs; and
a host driver associated with the first processor, the host driver configured to:
service events sent by the guest VMs;
track a number of events sent by a first guest VM during a first period of time;
ignore subsequent events sent from the guest VM to the host driver until the first period of time has elapsed in response to detecting more than a threshold number of events sent from the first guest VM during the first period of time; and
service subsequent events sent from the first guest VM to the host driver after the first period of time has elapsed and reset a timer for the first guest VM.

16. The processing system of claim 15, wherein the host driver is further configured to:
track the number of events sent by the guest VM during the first period of time using a counter; and
reset the counter to zero in response to the first period of time elapsing.

17. The processing system of claim 15, wherein the host driver is further configured to:
track a number of events of a first event type sent from the guest VM during the first period of time and track a number of events of a second event type different from the first event type sent by the guest VM during a second period of time; and
ignore subsequent events of the first event type send from the guest VM to the host driver until the first period of time has elapsed in response to detecting more than a first threshold number of events of the first event type sent from the guest VM during the first period of time and ignoring subsequent events of the second event type sent from the guest VM to the host driver until the second period of time has elapsed in response to detecting more than a second threshold number of events of the second event type sent from the guest VM during the second period of time.

18. The processing system of claim 17, wherein the first event type comprises one of: function level reset requests, exclusive access mode requests, exclusive access time out events, or generic interrupt requests.

19. The processing system of claim 17, wherein the first threshold number of events—and a duration of the first period of time are based on the first event type.

20. The processing system of claim 15, wherein the processing system is configured to set the first threshold number of events and a duration of the first period of time for a plurality of processors.

21. A host system, comprising:
a driver configured to service events from a guest virtual machine (VM); and
an event guard module configured to:
signal the driver to ignore events from the guest VM in response to determining that a number of events sent from the guest VM within a first predetermined period of time exceeds a first threshold; and
after the first predetermined period of time has elapsed, signal the driver to resume servicing subsequent events sent from the guest VM and resetting a timer for events received from the guest VM.

* * * * *